(12) United States Patent
Alhebshi et al.

(10) Patent No.: US 11,158,125 B1
(45) Date of Patent: *Oct. 26, 2021

(54) IMAGE SENSOR SYSTEM AND SMART CLOSET DEVICE

(71) Applicant: King Abdulaziz University, Jeddah (SA)

(72) Inventors: Tala Hashem Mohammed Alhebshi, Jeddah (SA); Laila Ahmed Salim Bahammam, Jeddah (SA)

(73) Assignee: King Abdulaziz University, Jeddah (SA)

(*) Notice: Subject to any disclaimer, the term of this patent is extended or adjusted under 35 U.S.C. 154(b) by 0 days.

This patent is subject to a terminal disclaimer.

(21) Appl. No.: 17/377,909

(22) Filed: Jul. 16, 2021

Related U.S. Application Data

(63) Continuation of application No. 17/232,801, filed on Apr. 16, 2021, which is a continuation of application No. 17/091,192, filed on Nov. 6, 2020.

(51) Int. Cl.
*G06T 19/00* (2011.01)
*G06F 16/51* (2019.01)
*G06Q 30/06* (2012.01)
*G06K 7/14* (2006.01)
*H04N 5/247* (2006.01)
(Continued)

(52) U.S. Cl.
CPC ............ *G06T 19/00* (2013.01); *A47B 61/00* (2013.01); *G06F 16/51* (2019.01); *G06K 7/1413* (2013.01); *G06Q 30/0643* (2013.01); *H04N 5/247* (2013.01); *H04N 13/257* (2018.05);
(Continued)

(58) Field of Classification Search
None
See application file for complete search history.

(56) References Cited

U.S. PATENT DOCUMENTS

| 10,134,083 | B2 | 11/2018 | Adeyoola et al. |
| 10,134,296 | B2 | 11/2018 | Anderson et al. |
| | | (Continued) | |

OTHER PUBLICATIONS

Dirk Siegmund, et al., "Virtual Fitting Pipeline: Body Dimension Recognition, Cloth Modeling, and On-Body Simulation", Workshop on Virtual Reality Interaction and Physical Simulation VRIPHYS, Sep. 2014, 9 pages.

(Continued)

*Primary Examiner* — Saptarshi Mazumder
(74) *Attorney, Agent, or Firm* — Oblon, McClelland, Maier & Neustadt, L.L.P.

(57) ABSTRACT

A system configured to facilitate virtual outfit fitting is described. The system includes a smart closet device having components including a display door and a plurality of image sensors. A first image sensor of the plurality of image sensors is configured to move across a horizontal axis and a vertical axis of enclosure of the smart closet device to capture a plurality of images of a first outfit hung on an outfit hanging column. The smart closet device also includes a computing unit to generate a three-dimensional (3D) model of the first outfit based on the plurality of images. The computing unit is further configured to update an outfit database by storing the generated 3D model of the first outfit in an outfit database. The computing unit generate an image of a user wearing the output in response to receiving a selection of the first output from the user.

13 Claims, 9 Drawing Sheets

(51) Int. Cl.
*H04N 13/257* (2018.01)
*A47B 61/00* (2006.01)
*G06F 3/0488* (2013.01)

(52) U.S. Cl.
CPC .... *A47B 2220/0091* (2013.01); *G06F 3/0488* (2013.01); *G06T 2200/24* (2013.01)

(56) References Cited

U.S. PATENT DOCUMENTS

| | | | |
|---|---|---|---|
| 2006/0184993 A1* | 8/2006 | Goldthwaite | G06F 3/011 |
| | | | 725/135 |
| 2014/0149264 A1* | 5/2014 | Satyanarayana | G06Q 30/06 |
| | | | 705/27.2 |
| 2014/0168217 A1 | 6/2014 | Kim et al. | |
| 2015/0154691 A1 | 6/2015 | Curry et al. | |
| 2016/0180447 A1 | 6/2016 | Kamalie et al. | |
| 2018/0197331 A1* | 7/2018 | Chen | G06F 30/20 |
| 2019/0114472 A1* | 4/2019 | Hodge | H04N 7/181 |

OTHER PUBLICATIONS

Sasadara B. Adikari, et al., "Applicability of a Single Depth Sensor in Real-Time 3D Clothes Simulation: Augmented Reality Virtual Dressing Room Using Kinect Sensor", Advances in Human-Computer Interaction, Article ID: 1314598, 2020, pp. 1-10.

* cited by examiner

IMAGE SENSOR SYSTEM AND SMART CLOSET DEVICE

CROSS-REFERENCE TO RELATED APPLICATIONS

The present application is a Continuation of U.S. application Ser. No. 17/232,801, pending, having a filing date of Apr. 16, 2021, which is a Continuation of U.S. application Ser. No. 17/091,192, pending, having a filing date of Nov. 6, 2020.

BACKGROUND OF THE INVENTION

Technical Field

The present disclosure is directed to virtual outfit fitting technologies, and in particular to systems and methods for virtual outfit fitting based on a smart wardrobe.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Conventional methods of shopping involved customers visiting physical stores to select and try on outfits before making a purchase. Customers prefer physically trying on the outfits to ensure the outfit is of correct size, the outfit properly fits and match their body figures, the outfit is comfortable and the like. Also, sizes for a customer often differ from one brand of clothing to another and from one style to another. So, the customers prefer to physically wear and test the outfits before making a purchase decision. However, physically wearing and testing the outfits is a time consuming process as a customer has to wear and test several outfits before the customer can decide on design, color, size, fitting, etc., of an outfit that satisfies him or her. In some situations, the customer may have to wait in a long queue outside a fitting room in order to wear and test the outfit. Many times the customers get frustrated due to long waits and may not make a purchase. Also, sometimes the customers worry about hygiene issues. Especially during a pandemic customers are reluctant to wear the clothing for testing.

Online shopping provides respite and an alternative to physical shopping. In online shopping, customers make a purchase and size selection decision based on two dimensional (2D) images of the outfits and choosing sizes which they deem accurate. With the problem of non-standard sizing of clothes by different brands, the chosen size may not be accurate. These methods are not accurate and not interactive in providing the right sizes and choices to the customers. As a result, many times customers end up buying wrong sizes and return the product soon after. This results in loss of sales, loss of trust in brands, loss for brands in shipping and return costs and wastage of merchandise.

A system for generating an image of a first user in a garment was described in U.S. Pat. No. 10,134,083 B2 "Computer implemented methods and systems for generating virtual body models for garment fit visualisation" and a computing device for controlling a movement training environment was described in U.S. Pat. No. 10,134,296 B2 "Enhancing movement training with an augmented reality mirror", each of which is incorporated herein by reference in its entirety. However, the systems described in these references and other conventional systems suffer from various limitations. The lack of sizing standards combined with unreliable labeling cause outfit fitting problems, which in turn cause a very high rate of outfit returns, lost sales, time wasted in fitting rooms, and a bad shopping experience.

SUMMARY

In an exemplary embodiment, a system for facilitating virtual outfit fitting is described. The system includes a smart closet device having components including a display door on a front face of the smart closet device configured to open and close to provide access to an enclosed space within the smart closet device, a plurality of image sensors, where a first image sensor of the plurality of image sensors is positioned in the enclosed space and is configured to move across a horizontal axis and a vertical axis of the smart closet device, and a computing unit operatively connected to the components. The computing unit is configured to capture a plurality of images of a first outfit hung on an outfit hanging column by the first image sensor across the horizontal axis and the vertical axis, where the outfit hanging column is positioned in the enclosed space and is configured to hang outfits, generate a three-dimensional (3D) model of the first outfit based on the captured plurality of images, and update an outfit database by storing the generated 3D model of the first outfit in the outfit database, wherein the outfit database includes 3D models corresponding to a plurality of outfits. The computing unit is further configured to retrieve the 3D models corresponding to the plurality of outfits from the updated outfit database in response to detecting a user in the vicinity of a second image sensor of the plurality of image sensors, where the retrieved 3D models corresponding to the plurality of outfits includes the generated 3D model of the first outfit. The computing unit then generates a user interface on the display door to display the retrieved 3D models corresponding to the plurality of outfits, receives a selection of the generated 3D model of the first outfit from the displayed 3D models corresponding to the plurality of outfits, determine a body size of the user by capturing a plurality of images of the user by the second image sensor, upon receiving the selection of the generated 3D model of the first outfit, generate an image of the user corresponding to the determined body size of the user on the user interface, and overlay the generated 3D model of the first outfit over the generated image of the user on the user interface.

In another exemplary embodiment, a smart closet device for facilitating the virtual outfit fitting is described. The smart closet device includes a display door on a front face of the smart closet device and is configured to open and close to provide access to an enclosed space within the smart closet device, a plurality of image sensors, where a first image sensor of the plurality of image sensors is positioned in the enclosed space and is configured to move across a horizontal axis and a vertical axis of the smart closet device, and one or more processors configured to capture a plurality of images of a first outfit hung on an outfit hanging column by the first image sensor across the horizontal axis and the vertical axis, where the outfit hanging column is positioned in the enclosed space and is configured to hang outfits, generating a three-dimensional (3D) model of the first outfit based on the captured plurality of images, updating an outfit database by storing the generated 3D model of the first outfit in the outfit database, wherein the outfit database includes 3D models corresponding to a plurality of outfits, retrieving the 3D models corresponding to the plurality of outfits from the updated outfit database, in response to detecting a user in the vicinity of a second image sensor of the plurality of image sensors, wherein the retrieved 3D models corresponding to the plurality of outfits includes the generated 3D model of the first outfit, generating a user interface on the display door to display the retrieved 3D models corresponding to the plurality of outfits, receiving a selection of the generated 3D model of the first outfit from the displayed 3D model corresponding to the plurality of outfits, determining a body size of the user by capturing a plurality of images of the user by the second image sensor, upon receiving the selection of the generated 3D model of the first outfit, generating an image of the user corresponding to the determined body size of the user on the user interface, and overlaying the generated 3D model of the first outfit over the generated image of the user on the user interface.

The foregoing general description of the illustrative aspect of the present disclosures and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
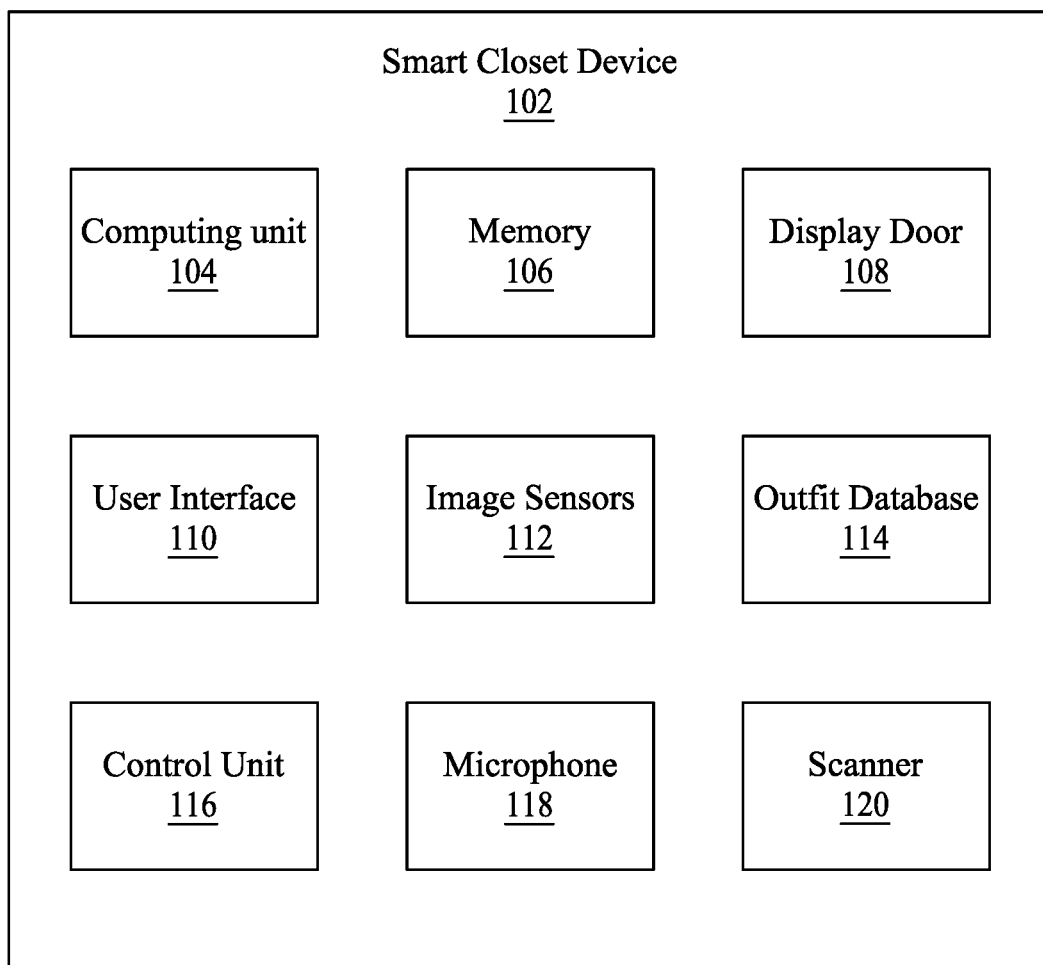
FIG. 1 depicts architecture of a system including a smart closet device for facilitating virtual outfit fitting, according to exemplary aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

Aspects of the present disclosure are directed to a system for facilitating virtual outfit fitting. The present disclosure allows users to select and try different outfits without physically wearing them.

FIG. 1 depicts architecture of a system 100 including a smart closet device for facilitating virtual outfit fitting, according to exemplary aspects of the present disclosure.

According to aspects of the present disclosure, the system 100 includes a smart closet device 102. The smart closet device 102 provides visuals of users wearing different outfits without actually wearing the outfits. In other words, the smart closet device 102 is designed to help the users visualize how the outfits will look on them, without having to physically wear the outfits. By providing such visuals, the smart closet device 102 assists the users to make purchase decisions or at least help the users to narrow down the selection to a few outfits before physically trying them on in a retail setting. In a home setting, the smart closet device 102 assists the users in deciding which outfits to wear. Examples of an outfit include, but are not limited to, a shirt, a t-shirt, a top, a dress, a sweater, a sweatshirt, a skirt, a trouser, and a jacket. According to aspects of the present disclosure, the smart closet device 102 may be deployed in retail stores, home closets, or any other appropriate places to facilitate the process of selecting and trying on outfits without physically wearing them. The description hereinafter is explained with reference to outfits (or clothes) only for the purpose of explanation, it should not be construed as a limitation, and it is well appreciated that the present disclosure may also be applicable to various articles such as shoes, eyewear, fashion accessories, and the like.

In some aspects of the present disclosure, the smart closet device 102 may be of a rectangular prism shape. A rectangular prism is a polyhedron whose surface is formed by two equal and parallel rectangles called bases and by four lateral faces that are also parallel rectangles and that are equal to their respective opposing faces. Although the smart closet device 102 is described to be of the rectangular prism shape, in other aspects of the present disclosure, the smart closet device 102 may be designed in any desired shape and size. In accordance with the present disclosure, for the purpose of facilitating virtual outfit fitting (i.e., facilitating the process of selecting and trying on outfits), the smart closet device 102 of the present disclosure may be initially trained over a plurality of outfits. Smart closet device 102 may store a machine learning algorithm in memory 106 that is trained to predict or recommend outfits based on determining a user within a vicinity of image sensors 112. In an aspect of the present disclosure, the process of selecting and trying on the outfits by the users is performed in real-time. In some aspects of the present disclosure, the smart closet device 102 may be pre-trained or may be trained in real-time. In some aspects of the present disclosure, the smart closet device 102 may be trained when the smart closet device 102 is idle i.e., not in use. In an example, the smart closet device 102 may be trained as and when new outfits arrive at the retail store in which the smart closet device 102 is deployed.

An initial overview of machine learning and prediction is first provided immediately below and then specific exemplary embodiments of systems, methods, and devices for facilitating virtual outfit fitting are described in further detail. The initial overview is intended to aid in understanding some of the technology relevant to the systems, methods, and devices disclosed herein, but it is not intended to limit the scope of the claimed subject matter.

In the world of machine prediction, there are two subfields knowledge-based systems and machine-learning systems. Knowledge-based approaches rely on the creation of a heuristic or rule-base which is then systematically applied to a particular problem or dataset. Knowledge based systems make inferences or decisions based on an explicit "if-then" rule system. Such systems rely on extracting a high degree of knowledge about a limited category to virtually render all possible solutions to a given problem. These solutions are then written as a series of instructions to be sequentially followed by a machine.

Machine learning systems, unlike the knowledge-based systems, provide machines with the ability to learn through data input without being explicitly programmed with rules. For example, as just discussed, conventional knowledge-based programming relies on manually writing algorithms (i.e., rules) and programming instructions to sequentially execute the algorithms. Machine learning systems, on the other hand, avoid following strict sequential programming instructions by making data-driven decisions to construct their own rules. The nature of machine learning is the iterative process of using rules, and creating new ones, to identify unknown relationships to better generalize and handle non-linear problems with incomplete input data sets. A detailed explanation of one such machine learning technique is disclosed in the article: Michalski, R. S., Stepp, R. E. "Learning from Observation: Conceptual Clustering," Chapter 11 of Machine Learning: An Artificial Intelligence Approach, eds. R. S. Michalski, J. G. Carbonell and T. M. Mitchell, San Mateo: Morgan Kaufmann, 1983. Embodiments of the present disclosure implement a prediction model which uses machine learning.

According to some aspects of the present disclosure, the smart closet device 102 may include a computing unit 104 and a memory 106. The computing unit 104 may be implemented as one or more microprocessors, microcomputers, microcontrollers, digital signal processors, central processing units, graphical processing units, state machines, logic circuitries, and/or any devices that manipulate signals based on operational instructions. Among other capabilities, the computing unit 104 may be configured to fetch and execute computer-readable instructions stored in the memory 106. In an aspect of the present disclosure, the memory 106 may include any computer-readable medium known in the art including, for example, volatile memory, such as static random access memory (SRAM) and dynamic random access memory (DRAM) and/or nonvolatile memory, such as read only memory (ROM), erasable programmable ROM, flash memories, hard disks, optical disks, and magnetic tapes. The memory 106 may be capable of storing data and allowing any storage location to be directly accessed by the computing unit 104. The smart closet device 102 also includes a display door 108 and a user interface 110. In an example, the display door 108 is positioned on a front face of the smart closet device 102. The display door 108 is configured to open and close to provide access to an enclosed space within the smart closet device 102. In an example, the display door 108 may be configured to open and close in response to a user interaction. According to aspects of the present disclosure, the display door 108 may include a display screen, a touch screen, or any other appropriate display unit. Further, the user interface 110 may provide options, such as a soft keyboard, a soft pointer, or any other user selectable option to communicate, access and control various functions of the smart closet device 102. In some aspects of the present disclosure, the smart closet device 102 may include communication hardware such as a communication interface to communicate with other devices, such as web servers and external repositories. The smart closet device 102 may also include communication interfaces to facilitate multiple communications with a wide variety of networks and protocol types, including wired networks, for example, LAN, cable, etc., and wireless networks, such as WLAN, cellular, or satellite.

In some aspects of the present disclosure, the user interface 110 may be generated by the computing unit 104 on the display door 108. In an example, the user interface 110 may be generated as an applet or as a stand-alone interface. In an example, the computing unit 104 may generate the user interface 110 on the display door 108 based on conventional or proprietary methods and techniques. According to some aspects of the present disclosure, the smart closet device 102 may include an outfit hanging column (not shown in FIG. 1). The outfit hanging column may be positioned in the enclosed space within the smart closet device 102. In aspects of the present disclosure, the outfit hanging column may be configured to hang outfits.

The smart closet device 102 may also include a plurality of image sensors 112 (hereinafter collectively referred to as image sensors 112, and individually referred to as an image sensor 112). In an example, each image sensor 112 may be a red green blue-depth (RGB-D) camera. An RGB-D camera captures color images (or RGB images) along with per-pixel depth information. Known examples of the RGB-D camera includes a Microsoft® Kinect™ and Asus® Xtion™. In some aspects of the present disclosure, the image sensors 112 may be any imaging device such as a color camera.

In some aspects of the present disclosure, the image sensors 112 may include at least a first image sensor and a second image sensor. The first image sensor may be positioned in the enclosed space within the smart closet device 102 and configured to move across a horizontal axis and a vertical axis of the smart closet device 102. The second image sensor may be positioned on the front face of the smart closet device 102. According to aspects of the present disclosure, the first image sensor may capture a plurality of images of each outfit that is hung on the outfit hanging column. According to some aspects of the present disclosure, the first image sensor may provide the plurality of images of each outfit to the computing unit 104 for generation of a three-dimensional (3D) model of each outfit based on the captured plurality of images. The computing unit 104 may generate the 3D model of each outfit based on the captured plurality of images. In an example, a 3D model of an outfit may represent outfit data including outfit length, shoulder width, sleeve length, chest circumference, waist circumference, and other such information.

Additionally, lighting devices (not shown in drawings) may be installed within the enclosure 304 of the smart closet device 102. Lighting devices may be LED bulbs, incandescent bulbs, compact fluorescent light bulbs (CFL) or a combination of these, although any other type of lighting device may also be included.

Lighting devices are electrically coupled to image sensors 112 which is coupled to one or more batteries and/or to one or more power supply sources. The power supply is preferably four AA batteries, but an optional AC adapter is accommodated. Further, the lighting device is activated by image sensors 112. The lighting device allows for three modes: off, always on, and auto-on-off. In the auto-on-off mode, the lighting device lights when the image sensors 112 detects motion, and unless the image sensors 112 detects that the ambient light is above a certain level at which the lighting device is not needed. Upon detecting motion, the lighting device will light and stay lit for a predetermined time period, e.g. 90 seconds, and then automatically turn off. In an embodiment, lighting device may be turned on always and in an embodiment the lighting device may be turn off upon not detecting a motion for more than a predetermined time period. In an embodiment, the lighting device may turn on for a predetermined time period when display door 108 is opened.

Further, incandescent bulbs may be of 40 or 60 Watts and would provide 290 or 840 Lumens of light, however any other specifications of Wattage may also be included. CFL bulbs may be of 9 or 13 Watts and would provide 550 or 810 Lumens of light, however any other specifications of Wattage may also be included. LED bulbs may be of 6 or 9.5 Watts and would provide 450 or 800 Lumens of light, however any other specifications of Wattage may also be included.

According to some aspects of the present disclosure, the second image sensor may capture a plurality of images of a user(s) when the user(s) is in a vicinity of the second image sensor. A user may be said to be in a vicinity of the second image sensor if the user is in a field of view of the second image sensor. In an example, the field of view may be defined to be about 10 meters in the field of view of the second image sensor. In an example, the second image sensor starts capturing the plurality of images of the user when the user is in the vicinity of the second image sensor for more than a threshold period of time. For example, the second image sensor may start capturing the plurality of images of the user when the user moves into the vicinity and stays for more than 5 seconds.

According to some aspects of the present disclosure, the second image sensor may provide the plurality of images of the user to the computing unit 104 for further processing. The computing unit 104 may be configured to determine a body size of the user based on the plurality of images of the user captured by the second image sensor. The body size of the user is also referred to as body profile of the user. In a non-limiting example, the body size of the user may include height, chest circumference, waist circumference, hip circumference, arm width, arm length, thigh length, thigh circumference, head circumference, and other such information related to body parts of the user. In some aspects of the present disclosure, the body size or body measurements of the user may be pre-stored in the memory 106. For example, in situations where the user is a repeat customer or a regular customer, the body size of the user may have been previously determined and stored in the memory 106 for later use by the computing unit 104. Further, the memory 106 may optionally store information pertaining to the user such as personal details such as name, contact details, purchase history, and the like. The information pertaining to the user including the body size may hereinafter be referred to as user data.

Further, US Published Patent Application No. 2015/0154691 A1 to Curry et al. discloses various methods of generating body profile for users, which in incorporated by computing unit 104 to determine a body size of the user based on the plurality of images of the user captured by the second image sensor.

According to some aspects of the present disclosure, the smart closet device 102 may include an outfit database 114. The outfit database 114 may be configured to store 3D models corresponding to the plurality of outfits. Further, the outfit database 114 may be periodically or dynamically updated as required. For example, if an outfit is sold out, the 3D model corresponding to the sold out outfit may be removed from the outfit database 114. In another similar example, if a new outfit is added to the inventory, the smart closet device 102 may take images of the new outfit and generate a 3D model corresponding to the new outfit to be stored in the outfit database 114.

The smart closet device 102 may further include a control panel 116, a microphone 118, and a scanner 120. In an example, the control panel 116, the microphone 118, and the scanner 120 may be positioned on the front face of the smart closet device 102.

In some aspects of the present disclosure, the control panel 116 may manage operations of the smart closet device 102 and facilitates communication between, for example, the computing unit 104 and the image sensors 112 of the smart closet device 102. The control panel 116 may include one or more hardware elements for managing and controlling the smart closet device 102. In a non-limiting example, the one or more hardware elements may include one or more buttons, a keypad, and an access control card reader. In an example, the control panel 116 may include a door opening button to open/unlock the display door 108 of the smart closet device 102 and a door closing button to close/lock the display door 108. For example, the door opening button and the door closing button may be arranged next to each other on the control panel. Also, the functions of the door opening button and the door closing button may be displayed by symbols and characters such as arrows.

In a preferable embodiment, the door opening actuated by a proximity switch. The proximity switches triggered on approach of an individual preparing to use the closet. In an embodiment when the outside surface of the display door 108 is a mirror, control functions for the closet may be mounted remotely. For example, a pedestal set back 0.5-3 m from the outside surface. This permits an individual to control the closet from a distance while viewing a mirror image. Alternately, the front surface of the door (108) May include large-format CD screen that displays and idealized image of an outfit on an individual.

According to some aspects of the present disclosure, the microphone 118 may be enabled to detect voice commands. In some aspects of the present disclosure, a set of voice commands may be provided to the user to operate the smart closet device 102. These voice commands may be displayed or provided at the smart closet device 102. Further, the scanner 120 may be a barcode scanner, a quick response (QR) code scanner or any other scanner. Considering the example of the barcode scanner, the scanner 120 may capture and read barcodes, decode data included in the barcodes, and send the data to the computing unit 104 for further processing. In an example, each outfit may include a barcode attached to it. A barcode of an outfit may include information about the outfit such as a size of the outfit, a type of the outfit, a color of the outfit, a manufacturer of the outfit, a price of the outfit, and other such information related to the outfit.

Figure 2:
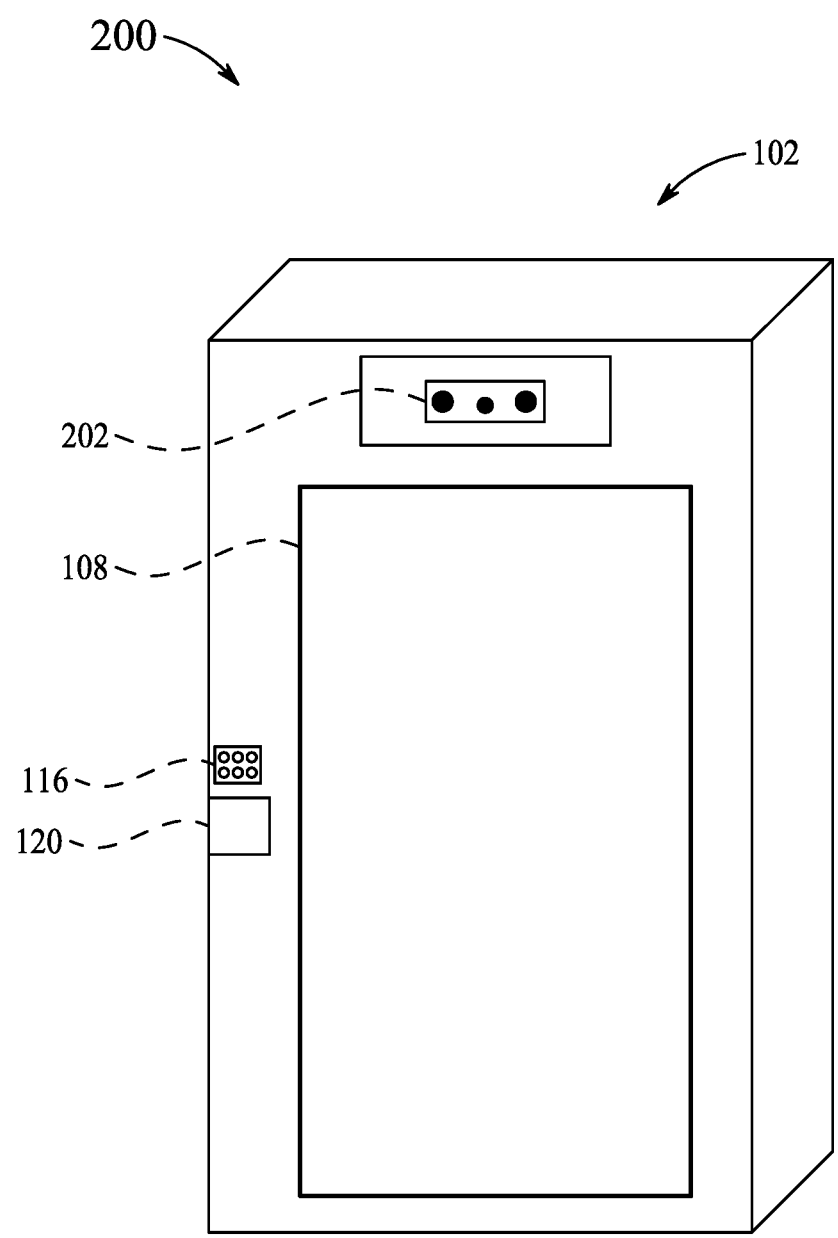
FIG. 2 depicts a perspective view of the smart closet device, according to exemplary aspects of the present disclosure.

FIG. 2 depicts a perspective view 200 of the smart closet device 102, according to exemplary aspects of the present disclosure.

FIG. 2 shows the smart closet device 102 in a closed state. According to an aspect of the present disclosure, the smart closet device 102 includes a second image sensor 202. As can be seen in FIG. 2, the second image sensor 202 is positioned on the front face of the smart closet device 102. In some aspects of the present disclosure, the second image sensor 202 may include a single image sensor. In other aspects of the present disclosure, the second image sensor 202 may include more than one image sensors. Further, as can be seen in FIG. 2, the smart closet device 102 includes the display door 108, the control panel 116, and the scanner 120.

Figure 3:
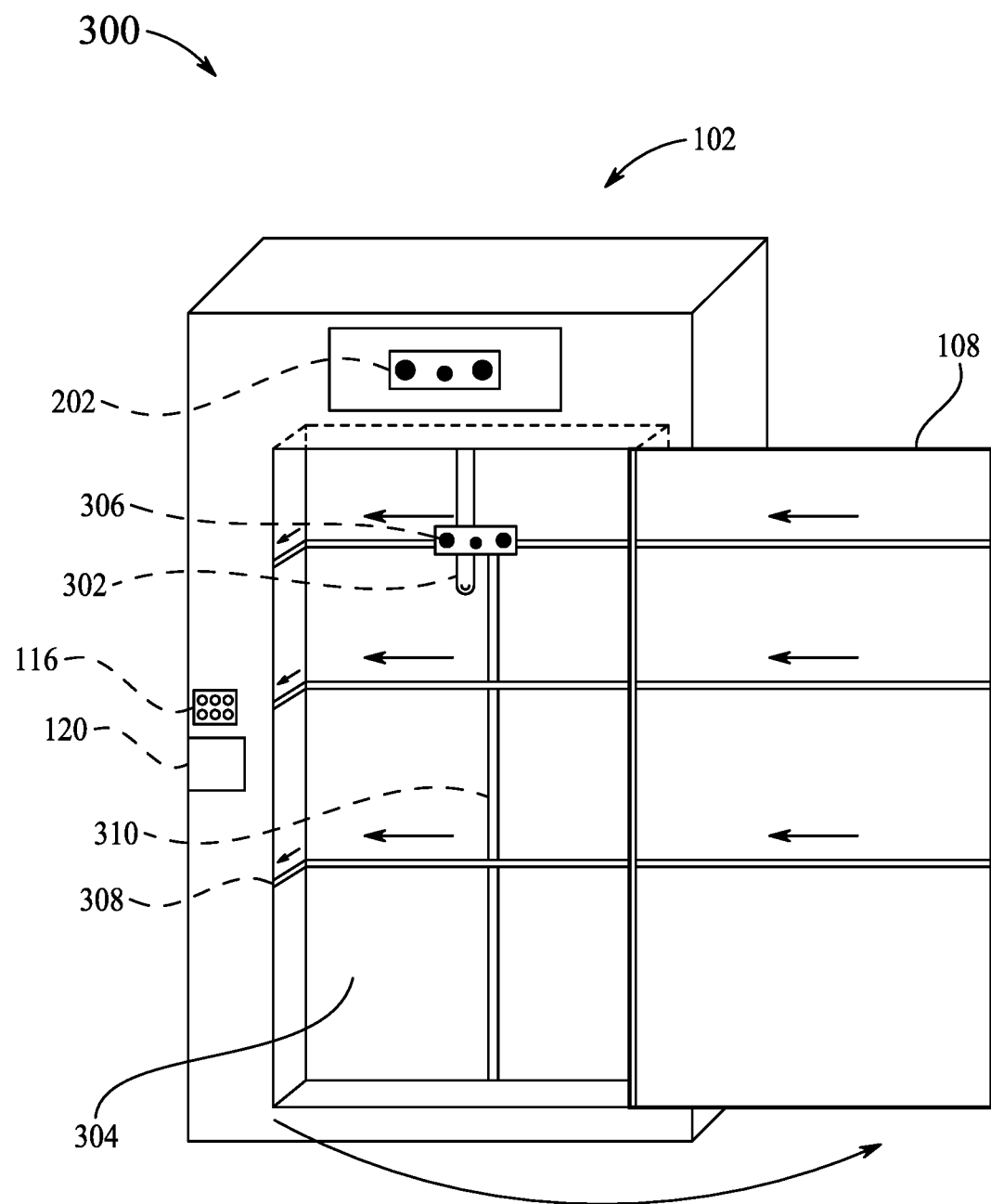
FIG. 3 depicts an inside view of the smart closet device, according to exemplary aspects of the present disclosure.

FIG. 3 depicts an inside view 300 of the smart closet device 102, according to exemplary aspects of the present disclosure.

As can be seen in FIG. 3, the smart closet device 102 includes an outfit hanging column 302 configured to hang outfits in an enclosure 304 and a first image sensor 306 in the enclosure 304. Images sensors 112 include image sensor 202 and image sensor 302. As shown in FIG. 3, the enclosure 304 of the smart closet device 102 includes a horizontal rail 308 and a vertical rail 310 for the movement of the first image sensor 306. In some aspects of the present disclosure, the enclosure 304 of the smart closet device 102 may include rails located on a top surface of the enclosure 304 extending from a front end to a back end of the enclosure 304 for the movement of the first image sensor 306 along a depth of the enclosure 304. The first image sensor 306 is configured to capture images of the outfits hung on the outfit hanging column 302 in the enclosure 304. The first image sensor 306 moves across a horizontal axis along the horizontal rail 308 and a vertical axis along the vertical rail 310 of the smart closet device 102.

According to an aspect of the present disclosure, for training the smart closet device 102 for a plurality of outfits, the plurality of outfits is placed inside the smart closet device 102. In an example, at a time one outfit may be placed inside the smart closet device 102. In another example, multiple outfits may be placed inside the smart closet device 102 at a time. Examples of an outfit include, but are not limited to, a shirt, a dress, a trouser, and a jacket. The present disclosure henceforth has been explained with reference to one outfit (interchangeably referred to as a first outfit) for the sake of brevity.

Whenever the smart closet device 102 is to be trained for an outfit, an operator of the smart closet device 102 may place the outfit inside the smart closet device 102. In one example, the operator may be an employee or a vendor of a retail store where the smart closet device 102 is deployed. In another example, if the smart closet device 102 is used for a home closet, then the operator may be an end-customer/consumer. In some aspects of the present disclosure, in order to place the outfit inside the smart closet device 102, the operator opens or unlocks the display door 108 of the smart closet device 102 and hangs the outfit on the outfit hanging column 302 of the smart closet device 102, and then closes or locks the display door 108.

According to some aspects of the present disclosure, the operator may open the display door 108 of the smart closet device 102 by one or more of: making a hand gesture, providing a voice command, interacting with the display door 108, and interacting with the control panel 116 of the smart closet device 102. In an example, the operator may wave his or her hand in front of the smart closet device 102 to open the display door 108 of the smart closet device 102. In some examples, the operator may make any kind of hand movement in front of the smart closet device 102 including thumbs up, hand sweep, pointing fist, or any other movement that operator can make with his or her hand. According to aspects of the present disclosure, the second image sensor 202 of the smart closet device 102 may track and recognize the hand gesture of the operator that the operator makes in front of the smart closet device 102. In response, the control panel 116 may trigger actuators to open the display door 108. As may be understood, the smart closet device 102 may be pre-trained for recognizing different hand gestures. In an example, the smart closet device 102 may be pre-trained based on conventional or proprietary methods and techniques.

In some aspects of the present disclosure, the operator may provide a voice command to the smart closet device 102 to open the display door 108. The voice command may be detected by the microphone 118 of the smart closet device 102. The voice command may be one of pre-recorded voice commands. Examples of pre-recorded voice commands may include "open", "open the door", "open the closet", "unlock", "unlock the door", and "unlock the closet", and other such voice commands. In some aspects of the present disclosure, the pre-recorded voice commands may be stored in the memory 106 of the smart closet device 102. In an example, the computing unit 104 may compare the voice command with pre-recorded voice commands to determine if the voice command is one of the pre-recorded voice commands. In response to the determination, the display door 108 gets opened.

According to some aspects of the present disclosure, the operator may interact with the control panel 116 of the smart closet device 102 to open the display door 108. In an example, the operator may press the "door opening" button on the control panel 116 to open the display door 108. In some examples, the operator may input authentication details using a keypad on the control panel 116. For example, the operator may input a password or a passcode to unlock the display door 108. Also, as described above, the display door 108 may be a touch screen. In an example, the operator may tap on the display door 108 to unlock it. In some examples, the operator may manually open the door. Other ways of opening or unlocking the display door 108 are possible and whilst not explicitly discussed, are contemplated herein.

Once the display door 108 gets opened, the operator may hang the outfit on the outfit hanging column 302. The hanging column 302 may be extendable such that it travels a distance of 0.1-0.8 times the height of the closet device 102. A retractable hanging column 302 permits better imaging of individual garments as they are scanned by image sensors 112. Preferably the hanging column 302 is mounted to a top horizontal surface in the interior of the enclosure 304 of the closet device 102. A ratcheting or worm drive-type motor [not shown in drawings] permits extension downwards of the column towards the bottom surface of the interior of the enclosure 304 of the closet device 102 or a rise towards the top of the interior of the enclosure 304 of the closet device 102. In other embodiments more than one hanging column 302 is present in the enclosure 304 of the closet device 102. A plurality of hanging columns 302 may be mounted on a rail that spans the width of the interior of the enclosure 304 of the closet device 102. Each hanging column 302 holds a single garment and can move from a far right position to a far left position while holding at a middle position in order to permit scanning by image sensors 112. In this way, the closet device 102 may accommodate multiple garments.

After hanging the outfit on the outfit hanging column 302, the operator may close the display door 108. In an example, the operator may close the display door 108 manually. In some aspects of the present disclosure, the display door 108 automatically gets closed and locked, for example, when the operator provides a voice command (such as "lock", "lock the door", "lock the closet", "close", "close the door", "close the closet", and other such voice commands), makes a hand gesture, interacts with the display door 108, and/or interacts with the control panel 116 of the smart closet device 102 in any way.

According to some aspects of the present disclosure, the first image sensor 306 may capture a plurality of images of the outfit hung on the outfit hanging column 302. In some aspects of the present disclosure, the first image sensor 306 may be configured to move across the horizontal rails 308 and the vertical rails 310 of the smart closet device 102. Also, the first image sensor 306 may be configured to rotate at 360 degrees while moving across the horizontal axis along the horizontal rail 308 and the vertical axis along the vertical rail 310 in order to capture the outfit accurately and completely (i.e., from all angles). In some aspects of the present disclosure, the smart closet device 102 may include a conveyor system and a motor to drive the conveyor system (not shown in FIG. 3). The conveyor system may include a plurality of outfit hanging columns (for hanging outfits), separated and spaced from each other. The conveyor system may move the outfits inside the smart closet device 102 at a fixed speed. Accordingly, multiple outfits can be placed inside the smart closet device 102 at a time. Further, each outfit may be brought in front of the first image sensor 306 one by one and the first image sensor 306 may capture the images of the outfits.

In some aspects of the present disclosure, the computing unit 104 may generate a 3D model of the outfit based on the captured plurality of images. In an example, the generated 3D model of the outfit may represent outfit data including outfit size, outfit length, shoulder width, sleeve length, chest circumference, waist circumference, and other such information related to the outfit. The computing unit 104 may use appropriate hardware and instructions to generate the 3D model of the outfit.

In some aspects of the present disclosure, the computing unit 104 may be configured to identify an outfit category associated with the generated 3D model of the outfit from a plurality of outfit categories. The computing unit 104 may analyze the generated 3D model of the outfit to identify the outfit category associated with the generated 3D model of the outfit. In a non-limiting example, the plurality of outfit categories includes a shirt category, a dress category, a trouser category, or a jacket category. In an example, the outfit category associated with the generated 3D model of the outfit may be identified to be a "shirt category". In a non-limiting example, the generated 3D model of the outfit may be indicative of the following information:

Outfit size—Medium (M)
Outfit Length—31 Inch
Shoulder Width—17 Inch
Sleeve Length—25 Inch
Chest—48 Inch
Waist—44 Inch In some aspects of the present disclosure, the operator may also scan a barcode of the outfit using the scanner 120. The scanner 120 may read the barcode, decode the data included in the barcode, and send the data to the computing unit 104. In an example, the barcode of the outfit may include information about the outfit such as a size of the outfit, material of the outfit, outfit type, a color of the outfit, a manufacturer of the outfit, a price of the outfit, and other such information related to the outfit. In some aspects of the present disclosure, the barcode may provide complete information of the outfit including the image of the outfit. In some example implementations, the scanner 120 may read the barcode to obtain an identity of the outfit. The computing unit 104 may communicate with a retail store database or a manufacturer's database to obtain information associated with the outfit including the image of the outfit based on the identity. According to some aspects of the present disclosure, the computing unit 104 may identify the outfit category associated with the generated 3D model of the outfit based on the information included in the barcode. The information that is included in the barcode of the outfit may be hereinafter referred to as outfit data.

Thereafter, the computing unit 104 may update the outfit database 114 by storing the generated 3D model of the outfit along with an identifier associated with the identified outfit category. In an example, the identifier associated with the identified outfit category may be pre-defined. In some aspects of the present disclosure, the outfit data may also be stored in the outfit database 114. In a similar manner as described above, outfit data, outfit categories, and 3D models corresponding to remaining outfits (for example, a second outfit, a third outfit, and so on) are generated and stored in the outfit database 114 for future use. Accordingly, the smart closet device 102 is trained for the plurality of outfits.

Although it has been described that the smart closet device 102 generates the 3D models of the plurality of outfits, however, according to an aspect of the present disclosure, the 3D models of the plurality of outfits may be extracted by an external computing device and stored in an external memory. The smart closet device 102 may obtain the 3D models of the plurality of outfits from the external memory for training the smart closet device 102.

According to an aspect of the present disclosure, for selection and trying on the outfits by a user in real-time, the second image sensor 202 of the smart closet device 102 may detect a presence of the user whenever the user is in a vicinity of the second image sensor 202. In some aspects of the present disclosure, the second image sensor 202 of the smart closet device 102 is always kept ON. Whenever the user appears in front of the second image sensor 202 or the user is in the vicinity of the second image sensor 202 for more than a threshold period of time, the second image sensor 202 may detect the presence of the user. In an example, if the user is in the vicinity of the second image sensor 202 for more than 5 seconds, then the second image sensor 202 may detect the presence of the user.

In response to the detection of the user in the vicinity of the second image sensor 202, the computing unit 104 may retrieve the 3D models corresponding to the plurality of outfits from the outfit database 114. In an example, the retrieved 3D models corresponding to the plurality of outfits may include the generated 3D model of the first outfit. Thereafter, the computing unit 104 may generate the user interface 110 on the display door 108 to display the retrieved 3D models corresponding to the plurality of outfits. In some aspects of the present disclosure, the computing unit 104 may receive a selection from the user of the generated 3D model of the outfit from the displayed 3D models corresponding to the plurality of outfits. In an example, the user can select the generated 3D model of the first outfit through hand gestures, voice commands, and/or interaction with the control panel 116 or the display door 108. As described earlier, the display door 108 may be a touch screen. In an example, the user may swipe through the 3D models corresponding to the plurality of outfits and tap on the generated 3D model of the first outfit to make the selection. In another example, the user may make hand gestures to view the 3D models corresponding to the plurality of outfits and select or choose the 3D model of the first outfit. In yet another example, the user may interact with the control panel 116. In yet another example, the user may scan a barcode of the desired outfit using the scanner 120. Other ways of selecting the 3D model of the first outfit (or any other desired outfit) for trying on are possible and whilst not explicitly discussed, are contemplated herein. In an example, the 3D models corresponding to the plurality of outfits may be arranged on the user interface 110 based on outfit categories including a shirt category, a dress category, a trouser category, or a jacket category.

Upon receiving the selection of the generated 3D model of the first outfit, the second image sensor 202 may capture a plurality of images of the user. According to some aspects of the present disclosure, the second image sensor 202 may provide the plurality of images of the user to the computing unit 104 for determination of the body size. The computing unit 104 may then determine the body size of the user based on the plurality of images of the user. In a non-limiting example, the body size of the user may include height, chest circumference, waist circumference, hip circumference, arm width, arm length, thigh length, thigh circumference, head circumference, and other such information related to body parts of the user.

In some aspects of the present disclosure, the smart closet device 102 may be pre-trained for the user. For example, in situations where the smart closet device 102 is deployed for home usage, the second image sensor 202 may use biometrics-based detection such as fingerprint, facial recognition, and the like to identify the user. Upon detecting the user, the computing unit 104 may retrieve the user data (including the body size) from the memory 106 without having to perform determination of the body size of the user based on the plurality of images of the user.

Thereafter, the computing unit 104 may generate an image of the user corresponding to the determined body size of the user on the user interface 110 and overlay the generated 3D model of the first outfit over the generated image of the user on the user interface 110. In an example, the 3D virtual image of the first outfit is displayed on the top of the user's body on the user interface 110. Thus, the user interface 110 provides a visual representation of the outfit on the user without the user actually wearing the outfit. Accordingly, the user can make a purchase decision. In some aspects of the present disclosure, information about the outfit such as size, color, type, description, price, etc., is also displayed on the user interface 110 to assist the user in making the purchase decision. According to an aspect of the present disclosure, the body size (or the body measurement) of the user is also displayed on the user interface 110 for future reference of the user. In a similar manner as described above, the user can select various outfits from amongst the plurality of outfits for trying on and the user can see virtual outfit fitting on his or her image generated corresponding to the determined body size of the user. In an example, the user can keep swiping through and tapping the outfits until the user finds one or more desired outfits.

According to some aspects of the present disclosure, the computing unit 104 may retrieve the 3D models corresponding to the plurality of outfits from the outfit database 114, in response to receiving an input from the user. In an aspect, the user may provide the input to the smart closet device 102 in form of one or more of a hand gesture, a voice command, and an interaction with the control panel 116. In an example, the user may access the smart closet device 102 using a membership card provided by a retail store in which the smart closet device 102 is deployed. For example, the user may swipe the membership card using the access control card reader on the control panel 116. The membership card may store information about the user including the body size of the user. Accordingly, when the user accesses the smart closet device 102 using the membership card, the smart closet device 102 (or the computing unit 104) recognizes the user and retrieves the body size of the user from the membership card. The computing unit 104 may then retrieve the 3D models corresponding to the plurality of outfits from the outfit database 114. In an example, the retrieved 3D models corresponding to the plurality of outfits includes the generated 3D model of the first outfit. The computing unit 104 may then display the 3D models corresponding to the plurality of outfits on the display door 108 (for example, on the user interface 110 generated on the display door 108). The computing unit 104 may then retrieve the generated 3D model of the first outfit, in response to receiving an input from the user and display the generated 3D model of the first outfit on the display door 108 or the user interface 110. In some aspects of the present disclosure, the computing unit 104 may generate an image of the user corresponding to the body size of the user retrieved from the membership card of the user. The computing unit 104 may display the image of the user on the user interface 110. Further, the computing unit 104 may then overlay the generated 3D model of the first outfit over the generated image of the user on the user interface 110.

Accordingly, the smart closet device 102 of the present disclosure facilitates the process of selecting and trying on outfits virtually (for example, the first image sensor 306 and the second image sensor 202) and augmented reality that will help embody outfits on the user body and assist the user in making purchase decision. This not only eliminates the need for users to physically wear the chosen/selected outfits, but also helps the users to make purchase decisions a lot faster and enhance their shopping experience. Thus, the smart closet device 102 allows the users to freely browse, select, and try-on their chosen outfits at their own convenience.

Figure 4:
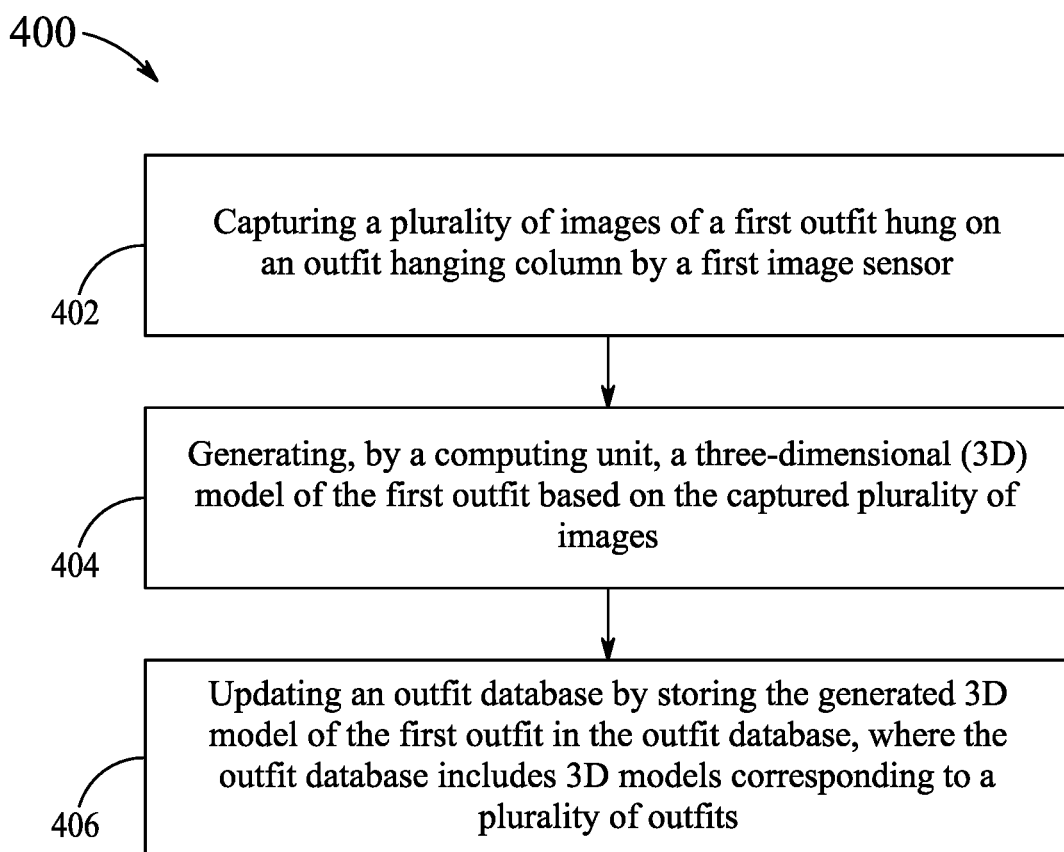
FIG. 4 illustrates a flowchart of a method for generating a three-dimensional (3D) model of a first outfit, according to exemplary aspects of the present disclosure.

FIG. 4 illustrates a flowchart of a method 400 for generating a three-dimensional (3D) model of a first outfit, according to exemplary aspects of the present disclosure.

At step 402, the method 400 includes capturing a plurality of images of a first outfit hung on the outfit hanging column 302 by the first image sensor 306. According to an aspect of the present disclosure, the first image sensor 306 moves across a horizontal axis along the horizontal rail 308 and a vertical axis along the vertical rail 310 of the smart closet device 102. Examples of the first outfit include, but are not limited to, a shirt, a dress, a trouser, and a jacket.

At step 404, the method 400 includes generating, by the computing unit 104, a three-dimensional (3D) model of the first outfit based on the captured plurality of images. In an example, the generated 3D model of the first outfit may represent outfit data including outfit size, outfit length, shoulder width, sleeve length, chest circumference, waist circumference, and other such information related to the first outfit.

At step 406, the method 400 includes updating the outfit database 114 by storing the generated 3D model of the first outfit in the outfit database 114, where the outfit database 114 includes 3D models corresponding to a plurality of outfits. In some aspects of the present disclosure, the computing unit 104 may also identify a first outfit category associated with the generated 3D model of the first outfit from a plurality of outfit categories based on analyzing the generated 3D model of the first outfit and update the outfit database 114 by storing the generated 3D model of the first outfit along with an identifier associated with the identified first outfit category. In an example, the plurality of outfit categories includes a shirt category, a dress category, a trouser category or a jacket category.

Figure 5:
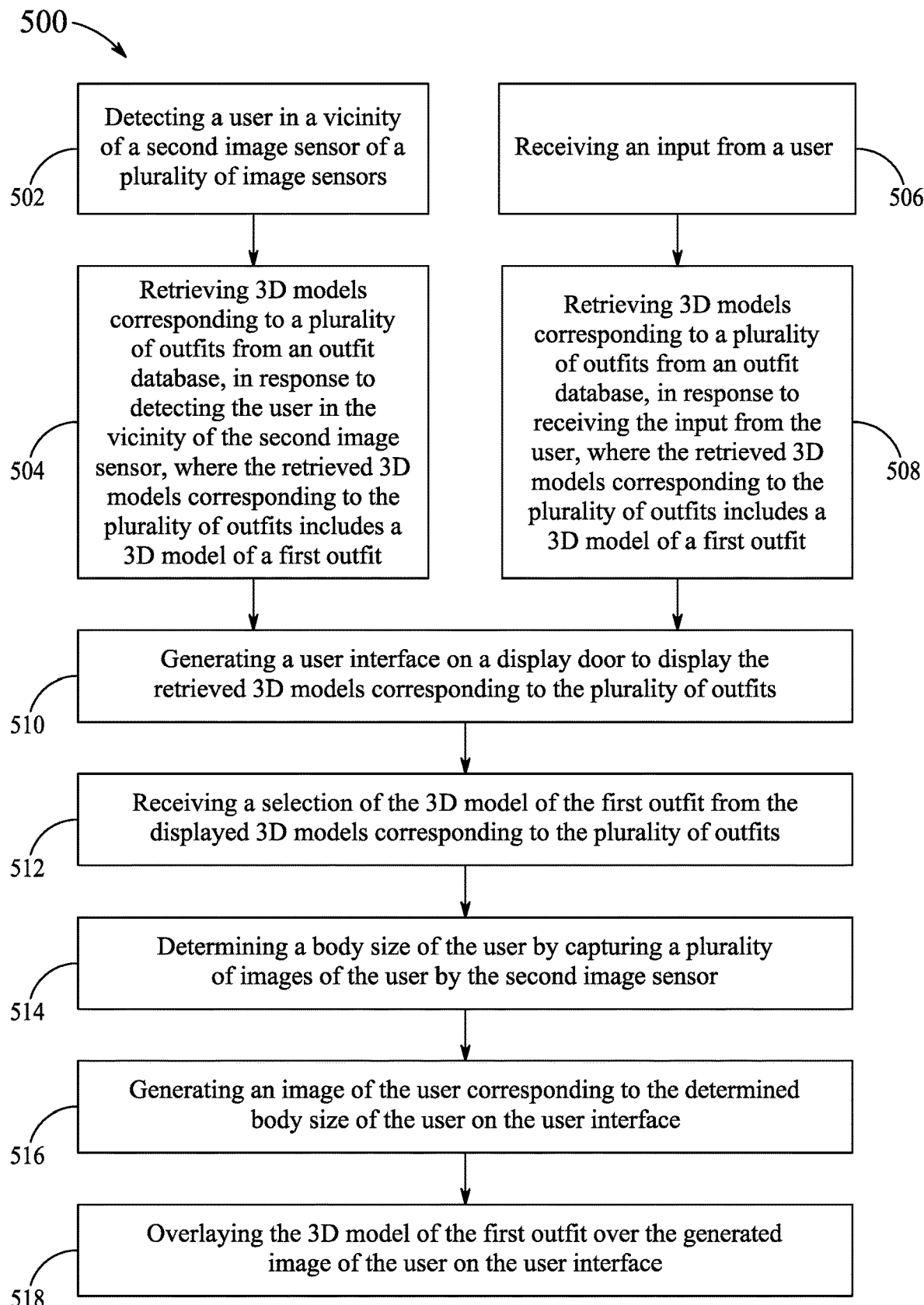
FIG. 5 illustrates a flowchart of a method for overlaying the 3D model of the first outfit over an image of a user, according to exemplary aspects of the present disclosure.

FIG. 5 illustrates a flowchart of a method 500 for overlaying the 3D model of the first outfit over an image of a user, according to exemplary aspects of the present disclosure.

At step 502, the method 500 includes detecting a user in a vicinity of the second image sensor 202 of a plurality of image sensors. A user may be said to be in a vicinity of the second image sensor 202 if the user is in a field of view of the second image sensor 202. In an example, the field of view may be defined to be about 10 meters in the field of view of the second image sensor 202. In an example, the second image sensor 202 starts capturing the plurality of images of the user when the user is in the vicinity of the second image sensor 202 for more than a threshold period of time. For example, the second image sensor 202 may start capturing the plurality of images of the user if the user is in the vicinity of it for more than 5 seconds.

At step 504, the method 500 includes retrieving 3D models corresponding to a plurality of outfits from the outfit database 114, in response to detecting the user in the vicinity of the second image sensor 202, where the retrieved 3D models corresponding to the plurality of outfits includes the 3D model of the first outfit.

At step 506, the method 500 includes receiving an input from a user. In an aspect of the present disclosure, the user may provide the input to the smart closet device 102 in form of one or more of a hand gesture, a voice command, and an interaction with the control panel 116.

At step 508, the method 500 includes retrieving 3D models corresponding to the plurality of outfits from the outfit database 114, in response to receiving the input from the user, where the retrieved 3D models corresponding to the plurality of outfits includes the 3D model of the first outfit.

At step 510, the method 500 includes generating the user interface 110 on the display door 108 to display the retrieved 3D models corresponding to the plurality of outfits. In some aspects of the present disclosure, the computing unit 104 may generate the user interface 110 on the display door 108 to display the retrieved 3D models corresponding to the plurality of outfits.

At step 512, the method 500 includes receiving a selection of the 3D model of the first outfit from the displayed 3D models corresponding to the plurality of outfits. In an example, the user can select the 3D model of the first outfit through hand gestures, voice commands, and/or interaction with the control panel 116 or the display door 108. As described earlier, the display door 108 may be a touch screen. In an example, the user may swipe through the 3D models corresponding to the plurality of outfits and tap on the generated 3D model of the first outfit to make the selection.

At step 514, the method 500 includes determining a body size of the user by capturing a plurality of images of the user by the second image sensor 202. According to aspects of the present disclosure, the computing unit 104 may determine the body size of the user based on the plurality of images of the user. In a non-limiting example, the body size of the user may include height, chest circumference, waist circumference, hip circumference, arm width, arm length, thigh length, thigh circumference, head circumference, and other such information related to body parts of the user.

At step 516, the method 500 includes generating an image of the user corresponding to the determined body size of the user on the user interface 110. According to some aspects of the present disclosure, the computing unit 104 may generate an image of the user corresponding to the determined body size of the user on the user interface 110.

At step 518, the method 500 includes overlaying the 3D model of the first outfit over the generated image of the user on the user interface 110. In some aspects of the present disclosure, the computing unit 104 may overlay the 3D model of the first outfit over the generated image of the user on the user interface 110. Thus, the user interface 110 provides a visual representation of the first outfit on the user without the user actually wearing the first outfit.

According to an aspect of the present disclosure, either the combination of steps 502 and 504 is performed together with steps 510-518, or the combination of steps 506 and 508 is performed together with steps 510-518.

Figure 6:
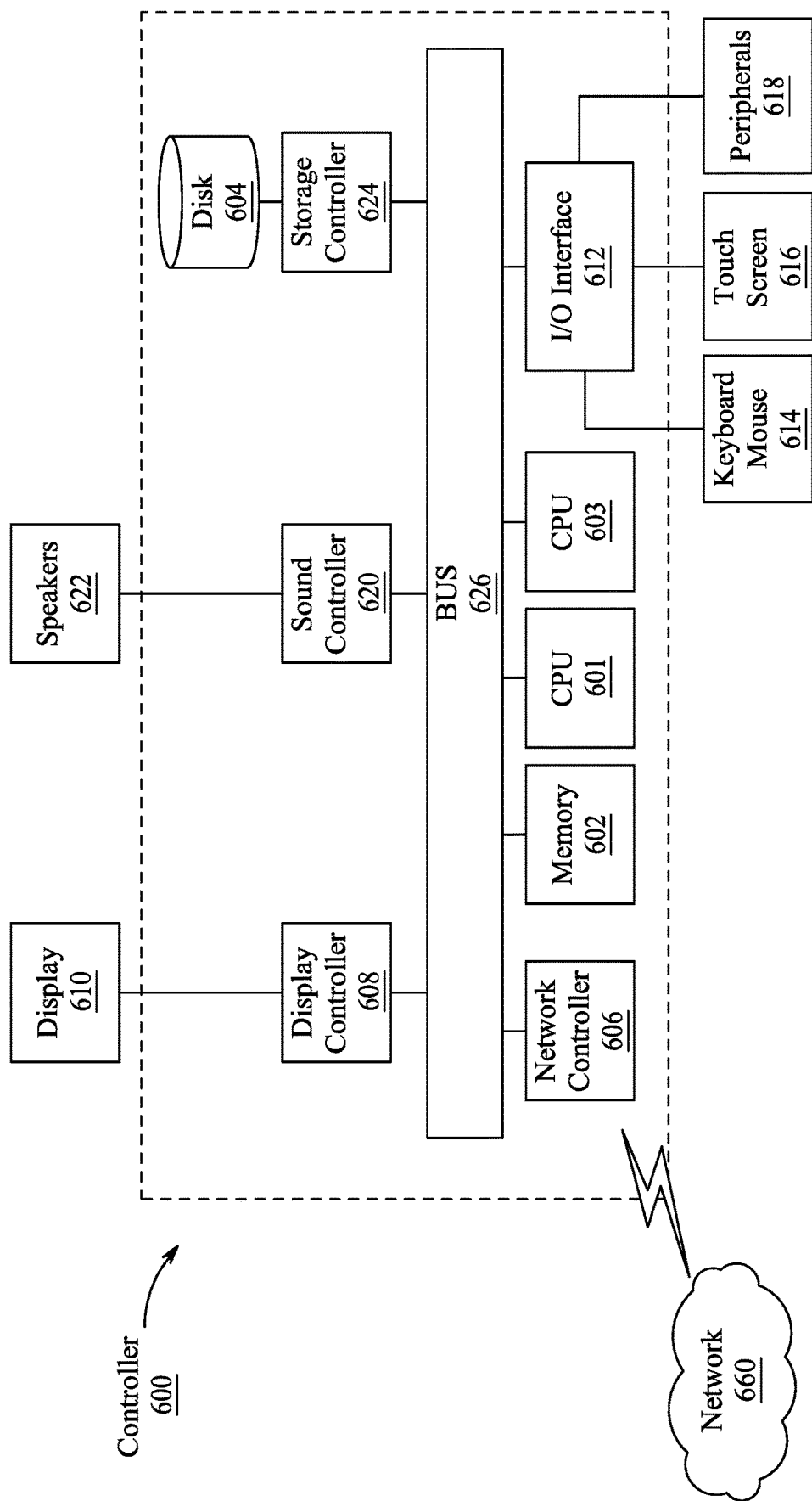
FIG. 6 is an illustration of a non-limiting example of details of computing hardware used in the computing system, according to exemplary aspects of the present disclosure.

FIG. 6 is an illustration of a non-limiting example of details of computing hardware used in the computing system, according to exemplary aspects of the present disclosure. In FIG. 6, a controller 600 is described which is a computing device and includes a CPU 601 which performs the processes described above/below. The process data and instructions may be stored in memory 602. These processes and instructions may also be stored on a storage medium disk 604 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 601, 603 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 601 or CPU 603 may be a Xenon or Core processor from Intel of America or an Opteron processor from AMD of America, or may be other processor types that would be recognized by one of ordinary skill in the art. Alternatively, the CPU 601, 603 may be implemented on an FPGA, ASIC, PLD or using discrete logic circuits, as one of ordinary skill in the art would recognize. Further, CPU 601, 603 may be implemented as multiple processors cooperatively working in parallel to perform the instructions of the inventive processes described above.

The computing device in FIG. 6 also includes a network controller 606, such as an Intel Ethernet PRO network interface card from Intel Corporation of America, for interfacing with network 660. As can be appreciated, the network 660 can be a public network, such as the Internet, or a private network such as an LAN or WAN network, or any combination thereof and can also include PSTN or ISDN sub-networks. The network 660 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 608, such as a NVIDIA GeForce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners, such as an OfficeJet or DeskJet from Hewlett Packard.

A sound controller 620 is also provided in the computing device such as Sound Blaster X-Fi Titanium from Creative, to interface with speakers/microphone 622 thereby providing sounds and/or music.

The general-purpose storage controller 624 connects the storage medium disk 604 with communication bus 626, which may be an ISA, EISA, VESA, PCI, or similar, for interconnecting all of the components of the computing device. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 7.

Figure 7:
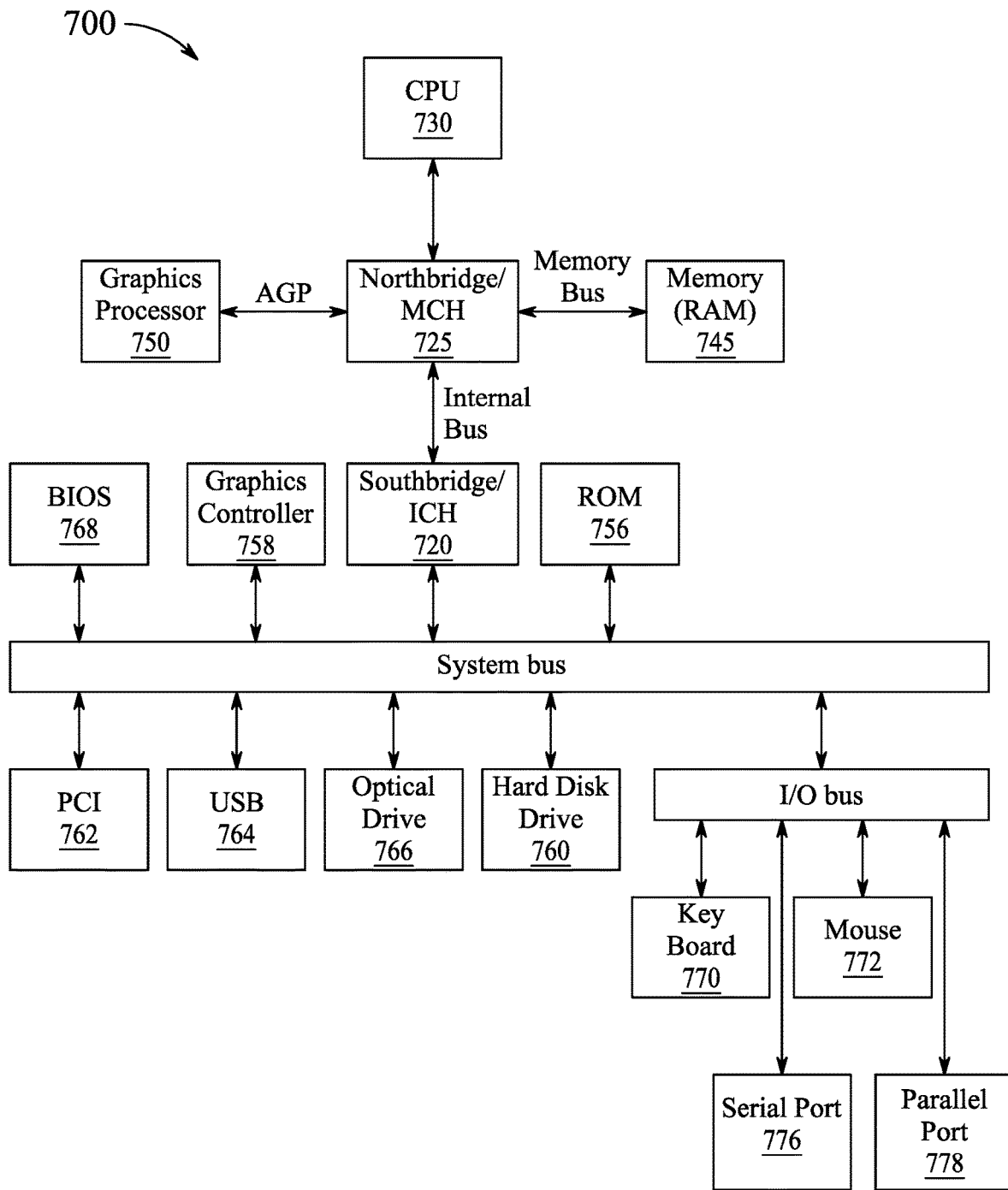
FIG. 7 is an exemplary schematic diagram of a data processing system used within the computing system, according to exemplary aspects of the present disclosure.

FIG. 7 shows a schematic diagram of a data processing system 700 used within the computing system, according to exemplary aspects of the present disclosure. The data processing system 700 is an example of a computer in which code or instructions implementing the processes of the illustrative aspects of the present disclosure may be located.

In FIG. 7, data processing system 700 employs a hub architecture including a north bridge and memory controller hub (NB/MCH) 725 and a south bridge and input/output (I/O) controller hub (SB/ICH) 720. The central processing unit (CPU) 730 is connected to NB/MCH 725. The NB/MCH 725 also connects to the memory 745 via a memory bus, and connects to the graphics processor 750 via an accelerated graphics port (AGP). The NB/MCH 725 also connects to the SB/ICH 720 via an internal bus (e.g., a unified media interface or a direct media interface). The CPU Processing unit 730 may contain one or more processors and even may be implemented using one or more heterogeneous processor systems.

Figure 8:
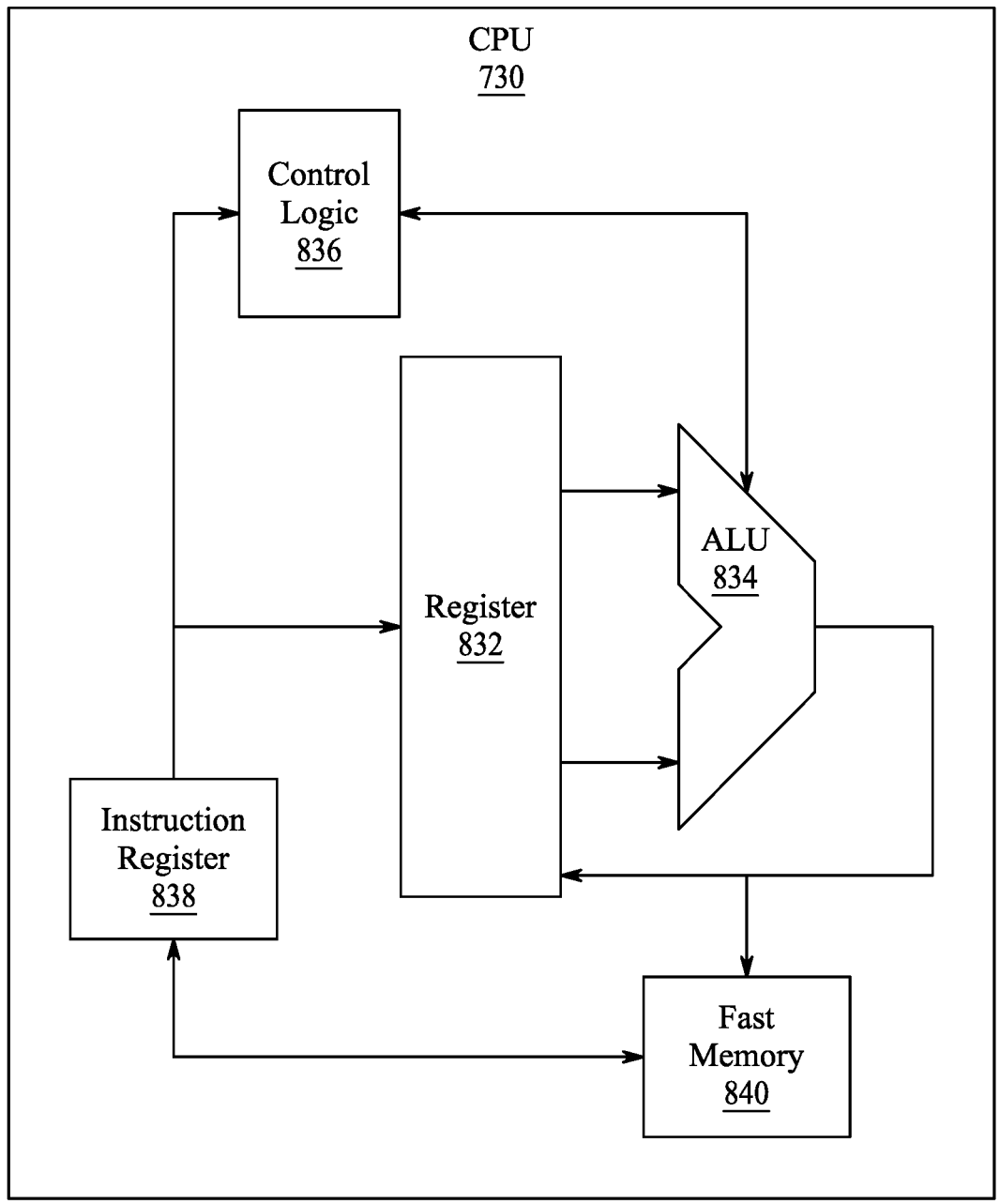
FIG. 8 is an exemplary schematic diagram of a processor used with the computing system, according to exemplary aspects of the present disclosure.

For example, FIG. 8 shows one aspects of the present disclosure of CPU 730. In one aspects of the present disclosure, the instruction register 838 retrieves instructions from the fast memory 840. At least part of these instructions is fetched from the instruction register 838 by the control logic 836 and interpreted according to the instruction set architecture of the CPU 730. Part of the instructions can also be directed to the register 830. In one aspects of the present disclosure the instructions are decoded according to a hardwired method, and in another aspects of the present disclosure the instructions are decoded according a microprogram that translates instructions into sets of CPU configuration signals that are applied sequentially over multiple clock pulses. After fetching and decoding the instructions, the instructions are executed using the arithmetic logic unit (ALU) 834 that loads values from the register 832 and performs logical and mathematical operations on the loaded values according to the instructions. The results from these operations can be feedback into the register and/or stored in the fast memory 840. According to certain aspects of the present disclosures, the instruction set architecture of the CPU 730 can use a reduced instruction set architecture, a complex instruction set architecture, a vector processor architecture, a very large instruction word architecture. Furthermore, the CPU 730 can be based on the Von Neuman model or the Harvard model. The CPU 730 can be a digital signal processor, an FPGA, an ASIC, a PLA, a PLD, or a CPLD. Further, the CPU 730 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 7, the data processing system 700 can include that the SB/ICH 720 is coupled through a system bus to an I/O Bus, a read only memory (ROM) 756, universal serial bus (USB) port 764, a flash binary input/output system (BIOS) 768, and a graphics controller 758. PCI/PCIe devices can also be coupled to SB/ICH 720 through a PCI bus 762.

The PCI devices may include, for example, Ethernet adapters, add-in cards, and PC cards for notebook computers. The Hard disk drive 760 and CD-ROM 756 can use, for example, an integrated drive electronics (IDE) or serial advanced technology attachment (SATA) interface. In one aspects of the present disclosure the I/O bus can include a super I/O (SIO) device.

Further, the hard disk drive (HDD) 760 and optical drive 766 can also be coupled to the SB/ICH 720 through a system bus. In one aspects of the present disclosure, a keyboard 770, a mouse 772, a parallel port 778, and a serial port 776 can be connected to the system bus through the I/O bus. Other peripherals and devices that can be connected to the SB/ICH 720 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 9:
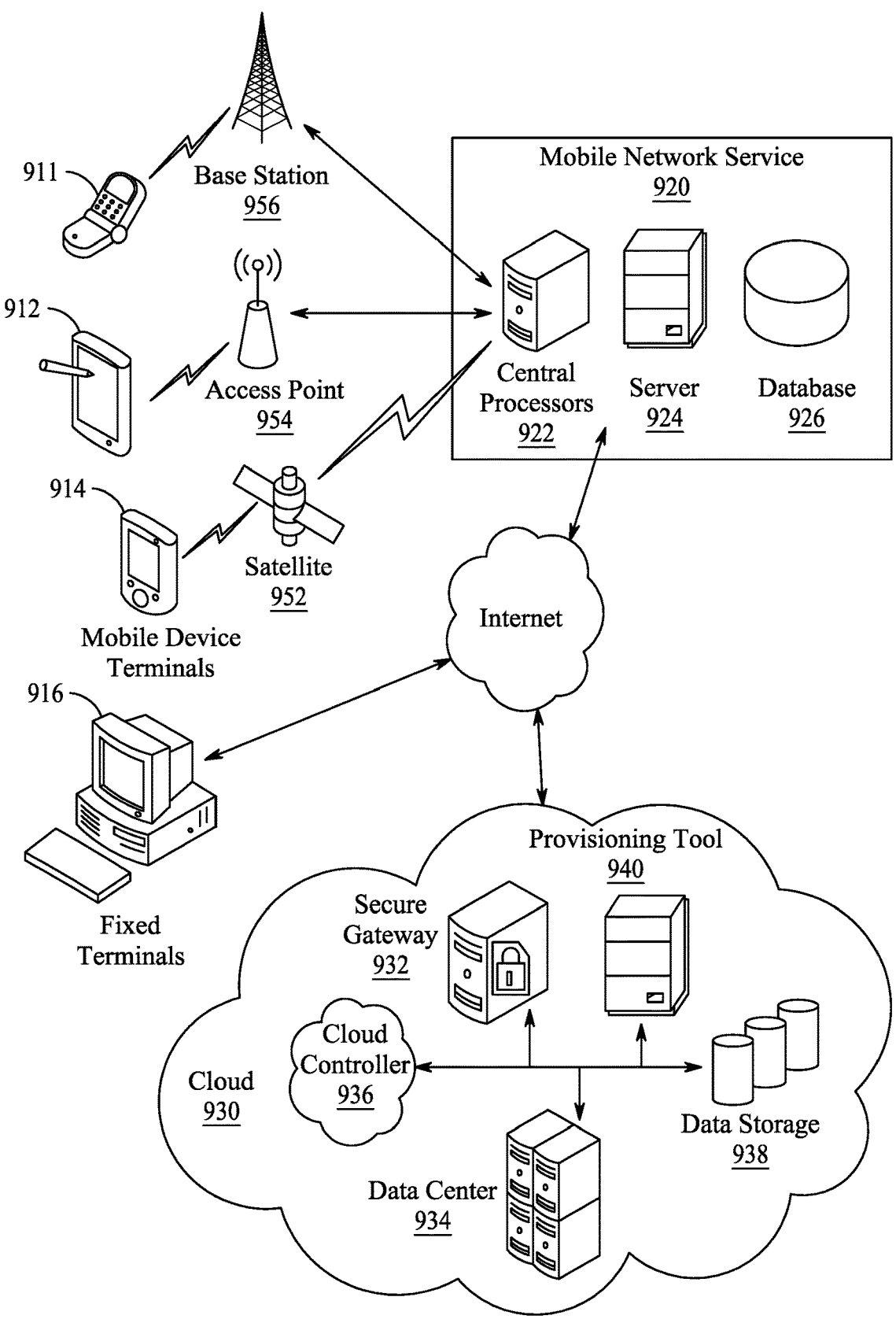
FIG. 9 is an illustration of a non-limiting example of distributed components which may share processing with the controller, according to exemplary aspects of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 9, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. An image sensor system for outfit fitting, the system comprising:
   a smart closet device including:
      a display door on a front face of the smart closet device, wherein the display door is configured to open and close to provide access to an enclosed space within the smart closet device;
      a plurality of image sensors, wherein a first image sensor of the plurality of image sensors is positioned in the enclosed space and is configured to move across a horizontal axis and a vertical axis of the smart closet device;
      a computing unit operatively connected to the display door and the image sensors, the computing unit comprising a memory including program instructions, said program instructions executable by processing circuitry, to cause the processing circuitry to:
         capture a plurality of images of a first outfit hung on an outfit hanging column by the first image sensor across the horizontal axis and the vertical axis, wherein the outfit hanging column is positioned in the enclosed space and is configured to hang outfits;
         generate a three-dimensional (3D) model of the first outfit based on the captured plurality of images;
         update an outfit database by storing the generated 3D model of the first outfit in the outfit database, wherein the outfit database includes 3D models corresponding to a plurality of outfits;
         retrieve the 3D models corresponding to the plurality of outfits from the updated outfit database, in response to detecting a user in the vicinity of a second image sensor of the plurality of image sensors, wherein the retrieved 3D models corresponding to the plurality of outfits includes the generated 3D model of the first outfit;
         generate a user interface on the display door to display the retrieved 3D models corresponding to the plurality of outfits;
         receive a selection of the generated 3D model of the first outfit from the displayed 3D models corresponding to the plurality of outfits;
         determine a body size of the user by capturing a plurality of images of the user by the second image sensor, upon receiving the selection of the generated 3D model of the first outfit;
         generate an image of the user corresponding to the determined body size of the user on the user interface; and
         overlay the generated 3D model of the first outfit over the generated image of the user on the user interface,
   wherein the smart closet device includes a horizontal rail and a vertical rail inside the enclosed space which is defined by a top, a bottom, the display door, two vertical side walls and a vertical back wall, wherein a first image sensor is configured to move within the enclosed space along the horizontal rail and the vertical rail.

2. The system of claim 1, wherein the one or more image sensors include one or more red green blue-depth (RGB-D) cameras.

3. The system of claim 1, wherein the display door includes a display screen or a touch screen.

4. The system of claim 1, wherein the smart closet device further includes:
   a control panel;
   a microphone; and
   a scanner.

5. The system of claim 4, wherein the display door is configured to open and close in response to a user interaction.

6. The system of claim 5, wherein the user interaction includes hand gesture detected by the second image sensor, a voice command detected by the microphone, or an interaction with the control panel.

7. The system of claim 4, wherein the scanner is a barcode scanner.

8. The system of claim 4, wherein the second image sensor, the control panel, and the scanner are positioned on the front face of the smart closet device.

9. The system of claim 1, wherein the computing unit causes the processing circuitry to:
   identify a first outfit category associated with the 3D model of the first outfit from a plurality of outfit categories based on analyzing the generated 3D model of the first outfit; and
   update the outfit database by storing the generated 3D model of the first outfit along with an identifier associated with the identified first outfit category.

10. The system of claim 1, wherein the plurality of outfit categories include a shirt category, a dress category, a trouser category or a jacket category.

11. The system of claim 1, wherein the computing unit causes the processing circuitry to:
   retrieve the 3D models corresponding with the plurality of outfits from the updated outfit database, in response to receiving an input from the user, wherein the retrieved 3D models corresponding with the plurality of outfits includes the generated 3D model of the first outfit; and
   display the 3D models corresponding with the plurality of outfits on the display door.

12. The system of claim 1, wherein the computing unit causes the processing circuitry to:
   retrieve the generated 3D model of the first outfit, in response to receiving an input; and
   display the generated 3D model of the first outfit on the display door.

13. The system of claim 1, wherein the computing unit causes the processing circuitry to:
   retrieve the 3D models corresponding with the plurality of outfits from the updated outfit database, in response to detecting the user in the vicinity of the second image sensor for more than a threshold period of time.

* * * * *